United States Patent [19]
Shkarvand-Moghaddam

[11] Patent Number: 5,211,828
[45] Date of Patent: May 18, 1993

[54] APPARATUS FOR GENERATING HYDROGEN AND OXYGEN

[76] Inventor: Rahim Shkarvand-Moghaddam, No. 8-Lashgari Alley, Sohrevardi St., Mollahhari Avenue, Tehran, Iran

[21] Appl. No.: 746,888

[22] Filed: Aug. 19, 1991

[30] Foreign Application Priority Data

Aug. 19, 1990 [IR] Iran .......................................... 28606

[51] Int. Cl.$^5$ ......................... C25B 9/00; C25B 15/02; C25B 15/08
[52] U.S. Cl. ..................................... 204/266; 204/278
[58] Field of Search ................ 204/256, 258, 263–266, 204/129, 270, 278

[56] References Cited

U.S. PATENT DOCUMENTS

| | | | |
|---|---|---|---|
| 807,640 | 12/1905 | Roberts | 204/266 X |
| 3,725,236 | 4/1973 | Johnson | 204/266 X |
| 3,761,221 | 9/1973 | Stillions | 204/278 X |
| 3,933,614 | 1/1976 | Bunn, Jr. | 204/266 |
| 4,361,474 | 11/1982 | Shoaf et al. | 204/278 X |

Primary Examiner—Donald R. Valentine
Attorney, Agent, or Firm—Young & Thompson

[57] ABSTRACT

Apparatus for generating heat, comprising a device for the electrochemical decomposition of water to generate hydrogen and oxygen, separate conduits for hydrogen and oxygen respectively, each one provided with a control device, and a device for mixing hydrogen and oxygen in a predetermined ratio, as well as a burner for the mixture. The apparatus is a unit in which the device for the electrochemical decomposition of the water is a tank with an anode compartment and a cathode compartment separated from each other by a wall which extends over essentially the entire height of the tank and has an opening adjacent the bottom of the tank and no higher than the lower end of the anode and/or cathode, which anode and cathode extend downwardly in each respective compartment. The conduits for oxygen and hydrogen downstream the control devices debouch into a mixing device in which the two streams of oxygen and hydrogen respectively impinge upon each other in the form of turbulent flows such that a homogeneous mixture is generated, which mixing device is followed downstream by a device having a series of vortex and impingement chambers interconnected by narrow passages within which the molecular composition is altered into $H_x O_y$, in which x and/or y deviate from x=2 and y=1.

7 Claims, 1 Drawing Sheet

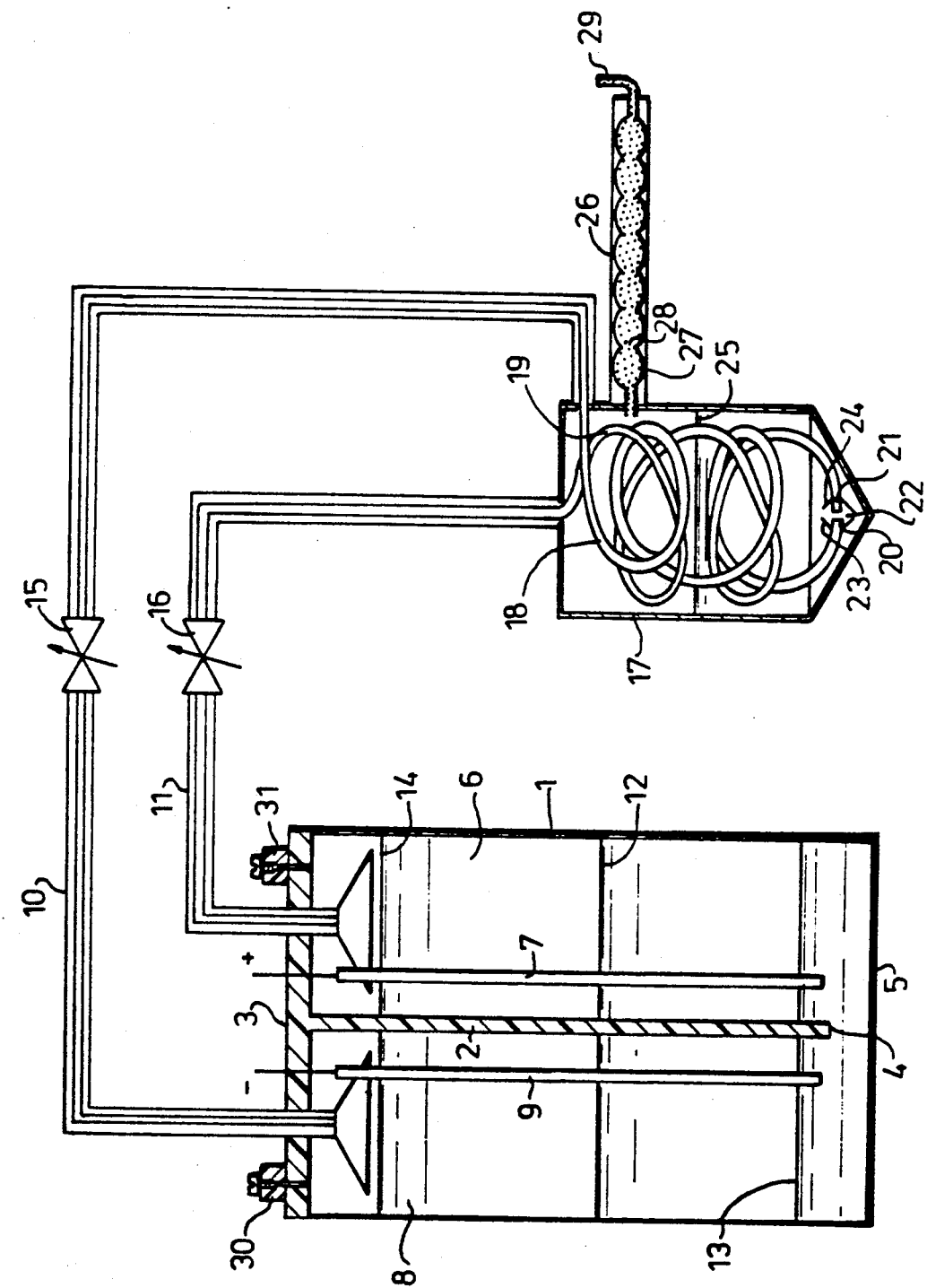

APPARATUS FOR GENERATING HYDROGEN AND OXYGEN

The invention relates to an apparatus for generating heat, comprising a device for the electrochemical decomposition of water to generate hydrogen and oxygen.
separate conduits for hydrogen and oxygen respectively,
each one provided with a control device, such as a valve,
and a device for mixing hydrogen and oxygen in a predetermined ratio, as well as
a burner or burning chamber for said mixture.
An apparatus of this type is known.

It is well known that the decomposition of water, which water is changed into an electrolyte by adding e.g. NaOH and subject to an electric potential between an anode and a cathode, generates hydrogen and oxygen.

The hydrogen and oxygen generated by means of such an electrochemical process are stored in reservoirs in gaseous or liquefied condition, and later on used for burning, for driving turbines, engines, rockets and the like.

It is well known that the energy necessary for the decomposition of the water into hydrogen and oxygen is in principle the same as the energy which becomes available if the two gas components are brought together and burnt resulting in water as combustion product.

It is this energy balance which has as its result that hydrogen and oxygen are only used as combustibles in those cases where efficiency is of minor or no importance. This is the reason as well why the device for the electrochemical decomposition of the water is a device which is separate from and often far away from the device where the two gases are combusted.

Purpose of the invention is to obtain an apparatus which allows efficient use and which, as will be explained later, has surprising effects.

According to the invention this purpose is achieved in that the apparatus is a unit in which the device for the electrochemical decomposition of the water is a tank with an anode compartment and a cathode compartment, said compartments being separated from each other by a wall which extends over essentially the entire height of the tank and has a gap or opening at or near the bottom of the tank and at or below the lower end of the anode and/or cathode, which anode and cathode respectively extend downwardly in each respective compartment, that the conduits for oxygen and hydrogen downstream the adjustable control devices debouch into a mixing device of the type in which the two streams of oxygen and hydrogen respectively impinge upon each other in the form of turbulent flows such that a homogeneous mixture is generated, which mixing device is followed downstream by a device having a series of vortex and impingement chambers interconnected by narrow passages within which the molecular composition is altered into $H_xO_y$, in which x and/or y deviate form x=2 and y=1.

Accordingly the invention proposes as apparatus for generating heat a single unit into which water is supplied as starting material, to which an electric current is supplied for performing the electrolytic process which is well known, which device at its outlet delivers a flame or debouches into a combustion chamber, such as e.g. the combustion chambers of an engine with internal combustion.

To control the proper mixture ratio the control devices in the oxygen and hydrogen conduits respectively are adjusted therewith taking into account the electrolytic production of oxygen and hydrogen the quantities of which differ. Due to the wall separating the two compartments from each other the difference in generated quantities of hydrogen and oxygen has a result that the liquid levels in the respective compartments differ. Usually the production of hydrogen will be higher, e.g. twice the production of oxygen, so that the level in the oxygen generating compartment, which is the anode compartment, rises whereas the liquid level in the hydrogen generating compartment, which is the cathode compartment, is lowered.

Due to the fact and according to the invention said separating wall ends at a short distance from the bottom or has one or more openings and due to the fact that the electrodes do not extend downwardly beyond said lower edge of the separating wall, the electric circuit is automatically interrupted as soon as the liquid level in one of the compartments lowers that far that contact with one of the electrodes is interrupted.

This generates an automatic control because a pressure difference is generated inside the electrochemical device which pressure difference is related to the adjustment of the valves in the hydrogen and oxygen conduits which are adjusted such that the two gases are mixable.

In the device which mixes and homogenizes the mixture the homogenizing takes care that no explosive mixtures are generated somewhere in the flow through the apparatus. In said device reaction with other substances is possible.

In the vortex and impingement chambers which follow downstream and are located between the mixing device and the burner a final change in the mixture takes place.

What exactly happens is not known, but the flame generates temperatures which are far above the temperature of 2700° C. of the combustion flame which occurs in case hydrogen and oxygen are burnt in the normal way. The flame according to the invention at the outlet or burner opening may have temperatures of 5000° to 6000° C. and more. The level of said high temperature is influenced by the presence or absence of other atoms which did react with the oxygen or hydrogen, such as carbon or organic compounds.

It is assumed that in the series of vortex and impingement chambers the hydrogen and oxygen atoms and eventually other atoms, such as carbon, form atom combinations which differ from the ratio of two hydrogen with respect to one oxygen.

BRIEF DESCRIPTION OF THE DRAWING

The invention now will be further explained with reference to the accompanying drawing which is a schematic cross-sectional view of apparatus according to the invention.

The apparatus according to the invention has been manufactured in the form of a prototype and functions.

The electric energy used in said prototype was 500 Watt, e.g. about 12 Volt and about 50 Ampere. The flame obtained was capable of evaporating pure tungsten which has an evaporating temperature of more than 5600°.

The drawing shows a tank 1 separated into two compartments by a wall 2 which from the top cover 3 extend downwardly having its lower edge 4 at a distance from the bottom 5 of the tank 1.

Of said compartments compartment 6 (at the right side of the wall 2) contains the anode 7 whereas the other compartment 8 contains the cathode 9.

The electric connections for anode and cathode are guided through the top cover 3 and in well known manner connected to a direct current source, not shown.

The lower ends of anode 7 and cathode 9 respectively are above the lower end 4 of the separating wall 2.

Tube 10 collects hydrogen and tube 11 oxygen. Since the hydrogen production normally will be larger than the oxygen production the liquid level 12 will change due to pressure difference in the respective compartments 6, 8 and e.g. in compartment 8 be at the line 13 and in compartment 6 at the level of the line 14.

As soon as the level 13 lowers more and loses contact with the cathode 9 the electrolytic process is interrupted, but immediately resumes because due to the interruption the production of hydrogen and oxygen stops and therewith the pressure difference diminishes.

Conduits 10 and 11 have adjustable valves 15 and 16 respectively. Instead of valves other control devices can be used. By adjusting the valves 15 and 16 a volume ratio between hydrogen and oxygen can be developed.

Said different quantities are fed into a mixing chamber 17 within which they first flow through helixes 18 and 19 respectively, said helixes, one of which is left hand whilst the other is right hand, have outlet ends 20 and 21 which are located opposite each other at a short distance from each other so that between said outlet ends 20 and 21 a space 22 is formed within which the two flows impinge upon each other.

Cup shaped walls 23 and 24 respectively may surround the outlet ends to form a vortex chamber.

In said tank 17 another substance can be present indicated with the level line 25 which substance may be ammonia, urea or another organic substance, which can react with the hydrogen and/or oxygen which emerge from the ends 20 and 21.

In said device 17 a homogeneous mixture is obtained which is fed into the last device 26 having the shape of a tube within which are formed a series of spherical chambers 27 interconnected by openings, such as 28, which in the direction downstream which is towards the burner 29 may decrease in diameter.

The tank 1 may have pressure compensation valves, such as 30 and 31. By means of said valves pressure compensation can be effected between the two compartments in case this would be necessary to maintain the process running.

I claim:

1. In apparatus for generating heat, comprising a device for the electrochemical decomposition of water to generate hydrogen and oxygen separate conduits for hydrogen and oxygen respectively, each one provided with a control device, and a device for mixing hydrogen and oxygen in a predetermined ratio, as well as a burner for said mixture; the improvement wherein the apparatus is a unit in which the device for the electrochemical decomposition of the water is a tank with an anode compartment and a cathode compartment, said compartments being separated from each other by a wall which extends over essentially the entire height of the tank and has an opening adjacent the bottom of the tank and no higher than the lower end of the anode and/or cathode, which anode and cathode respectively extend downwardly in each respective compartment, the conduits for oxygen and hydrogen downstream the control devices debouching into a mixing device in which the two streams of oxygen and hydrogen respectively impinge upon each other in the form of turbulent flows such that a homogeneous mixture is generated, which mixing device is followed downstream by a device having a series of vortex and impingement chambers interconnected by narrow passages within which the molecular composition is altered into $H_xO_y$, in which x and/or y deviate from x=2 and y=1.

2. Apparatus according to claim 1, wherein the mixing device has a space adapted to contain a different chemical substance, in which space the mixing of oxygen and hydrogen takes place and in which space atoms from another substance may react with the hydrogen and/or the oxygen.

3. Apparatus according to claim 1, wherein the series of vortex and impingement chambers is a series of substantially spherical chambers interconnected like beads.

4. Apparatus according to claim 3, wherein the areas of the passages from one chamber towards the next diminish downstream.

5. Apparatus according to claim 1, wherein the anode and/or cathode chamber(s) is (are) provided with a pressure compensation valve.

6. Apparatus according to claim 1, wherein the mixing device is a tank provided inside with a hydrogen pipe and an oxygen pipe of a design such that the flow through the said pipes is brought in rotation about the axis of the respective pipe, which rotational movements are counter rotative, and that said pipes have their outlet ends opposite each other with a space inbetween said outlet ends, in which space the counter rotative flows impinge upon each other.

7. Apparatus according to claim 6, wherein the hydrogen and oxygen pipe respectively inside the tank of the homogenizing mixing device extend according to a left turning and a right turning helix having inlets adjacent to the top of said device and the opposite spaced apart outlets adjacent to the bottom and below the downstream following series of vortex and impingement chambers.

* * * * *